United States Patent
Longman et al.

(10) Patent No.: US 12,386,026 B2
(45) Date of Patent: Aug. 12, 2025

(54) METHOD AND SYSTEM OF TIME-FREQUENCY SENSOR CODING FOR INTERFERENCE MITIGATION IN A VEHICLE

(71) Applicant: GM GLOBAL TECHNOLOGY OPERATIONS LLC, Detroit, MI (US)

(72) Inventors: Oren Longman, Tel Aviv (IL); Gaston Solodky, Kfar Sava (IL)

(73) Assignee: GM Global Technology Operations LLC, Detroit, MI (US)

( * ) Notice: Subject to any disclaimer, the term of this patent is extended or adjusted under 35 U.S.C. 154(b) by 373 days.

(21) Appl. No.: 18/084,616

(22) Filed: Dec. 20, 2022

(65) Prior Publication Data

US 2024/0201319 A1   Jun. 20, 2024

(51) Int. Cl.
*G01S 7/02* (2006.01)
*G01S 13/931* (2020.01)
*H04B 1/69* (2011.01)
*H04L 5/00* (2006.01)

(52) U.S. Cl.
CPC ............ *G01S 7/023* (2013.01); *G01S 13/931* (2013.01); *H04B 1/69* (2013.01); *H04L 5/0005* (2013.01); *H04L 5/0048* (2013.01); *H04L 5/0073* (2013.01); *H04B 2001/6912* (2013.01)

(58) Field of Classification Search
CPC ......... G01S 7/023; G01S 13/931; H04B 1/69; H04B 2001/691; H04L 5/0005; H04L 5/0048; H04L 5/0073
See application file for complete search history.

(56) References Cited

U.S. PATENT DOCUMENTS

| | | | | |
|---|---|---|---|---|
| 2016/0124075 | A1* | 5/2016 | Vogt | G01S 13/536 |
| | | | | 342/13 |
| 2019/0383925 | A1* | 12/2019 | Gulati | G01S 13/341 |
| 2022/0308160 | A1* | 9/2022 | Dent | G01S 7/2813 |
| 2024/0385282 | A1* | 11/2024 | Stefanatos | G01S 13/931 |

* cited by examiner

*Primary Examiner* — Vladimir Magloire
*Assistant Examiner* — Nazra Nur Waheed
(74) *Attorney, Agent, or Firm* — Quinn IP Law

(57) ABSTRACT

A system and method for time-frequency coding for interference mitigation of sensors is presented that includes generating and transmitting, from a vehicle, a first chirp signal by a first sensor, in a first time-channel and in a first frequency-channel. The method may also include generating and transmitting, a second chirp signal by a second sensor, in a second time-channel and in the first frequency-channel and the receiving, by the first sensor, a first reflection signal from objects from the first chirp signal. In addition, there may be a receiving, by the second sensor, a second reflection signal from objects from the second chirp signal. In addition, the first time-channel is orthogonal to the second time-channel, and the transmitting of the second chirp signal is offset in time from the transmitting of the first chirp signal by an amount less than a duration of the first chirp signal.

20 Claims, 10 Drawing Sheets

METHOD AND SYSTEM OF TIME-FREQUENCY SENSOR CODING FOR INTERFERENCE MITIGATION IN A VEHICLE

INTRODUCTION

Vehicles are rapidly integrating ever increasing technological components into their systems. Special use microcontrollers, technologies, and sensors may be used in many different applications in a vehicle. Automotive microcontrollers and sensors may be utilized in enhancing automated structures that offer state-of-the-art experience and services to the customers, for example in tasks such as body control, camera vision, information display, security, autonomous controls, etc. Further, functions such as adaptive cruise control, lane change assist, and vehicle proximity detection may use a variety of sensors using light detection and ranging (LIDAR), radio detection and ranging (RADAR), ultrasonic, and other wireless technologies to accomplish their functions.

However, with the prolific use of such wireless detection and communication sensors there is an ever-increasing possibility of interference between various vehicles and their systems. Thus, the ability to mitigate interference such that vehicle systems may operate successfully is critical.

SUMMARY

Disclosed herein is a vehicular system and method of time-frequency coding for interference mitigation of sensors. As disclosed herein, a sensor may contain components that are configured to transmit multiple signals, either simultaneously or overlapping in time, while also configured to receive multiple concurrent signals. Further, a single sensor or sensor assembly may include multiple sensors each with the ability to generate, transmit, and receive signals.

Thus, a system of time-frequency coding for interference mitigation of sensors may include one or more sensors, where for example a first sensor located within a vehicle may be used to generate and transmit a first chirp signal. The first chirp signal may be transmitted in a first time-channel and in a first frequency-channel. Further, the first sensor may also be used to receive a first reflection signal from one or more objects in the path of the transmitted first chirp signal. The system may also use a second sensor, either in the vehicle or outside of the vehicle, for example, in another vehicle, that may be used to generate and transmit a second chirp signal in a second time-channel, and may also be generated in the first frequency-channel. The second sensor may also be used to receive a second reflection signal from one or more objects from the second chirp signal. To further mitigate interference the first time-channel may be orthogonal to the second time-channel. Further, to provide additional time channels, the transmitting of the second chirp signal may be offset in time from the transmitting of the first chirp signal by an amount less than a duration of the first chirp signal.

Another aspect of the disclosure may include a third sensor that may be used to generate a waveform allocated across a plurality of time-frequency-channels.

Another aspect of the disclosure may include where the first sensor and the second sensor may be time synchronized.

Another aspect of the disclosure may include processing logic to determine a noise level of the first reflection signal and also the ability to store in memory the noise level including a time decay mechanism.

Another aspect of the disclosure may include where when the noise level is greater than a threshold, the first sensor may generate a subsequent chirp signal in a second time-frequency-channel, where the second time-frequency-channel may be orthogonal to a first time-frequency-channel.

Another aspect of the disclosure may include when the noise level is greater than a threshold level a current time-frequency-channel may be categorized as occupied.

Another aspect of the disclosure may include where the first sensor and the second sensor may not transmit on an occupied frequency channel.

Another aspect of the disclosure may include using processing logic to perform a range fast Fourier transform (FFT), a Doppler FFT, and a digital beamforming on the reflection signals.

Another aspect of the disclosure may include where the second sensor may not be located in the vehicle.

Another aspect of the disclosure may include where the first sensor and the second sensor may compensate for a distance from the one or more objects and may also compensate for synchronization error.

Another aspect of the disclosure may include a method for time-frequency coding for interference mitigation of sensors. Such a method may include generating and transmitting, from a vehicle, a first chirp signal by a first sensor, in a first time-channel and in a first frequency-channel. The method may also include the generating and transmitting of a second chirp signal by a second sensor, in a second time-channel and in the first frequency-channel. The method may continue by receiving, by the first sensor, a first reflection signal from one or more objects in the path of the first chirp signal. The method may also include receiving, by the second sensor, a second reflection signal from one or more objects from the second chirp signal. Further, the first time-channel may be orthogonal to the second time-channel. The method may also include where the transmitting of the second chirp signal may be offset in time from the transmitting of the first chirp signal by an amount less than a duration of the first chirp signal.

Another aspect of the disclosure may include generating, by a third sensor, a waveform allocated across a plurality of time-frequency-channels.

Another aspect of the disclosure may include time synchronizing the first sensor and the second sensor.

Another aspect of the disclosure may include determining, by a processing logic, a noise level of the first reflection signal, wherein the noise level is stored in a memory including a time decay mechanism.

Another aspect of the disclosure may include generating, when the noise level is greater than a threshold, by the first sensor, a subsequent chirp signal in a second time-frequency-channel, and wherein the second frequency-channel is orthogonal to a first time-frequency-channel.

Another aspect of the disclosure may include categorizing, when the noise level is greater than a threshold level, a current time-frequency channel as occupied.

Another aspect of the disclosure may include where the first sensor and the second sensor are configured not to transmit on an occupied frequency channel.

Another aspect of the disclosure may include performing, by a processing logic, a range fast Fourier transform (FFT), a Doppler FFT, and a digital beamforming on the first reflection signal.

Another aspect of the disclosure may include compensating, by the first sensor and the second sensor, for a distance from the one or more objects and a synchronization error.

Another aspect of the disclosure may include a method for time-frequency coding for interference mitigation of sensors. The method may include generating and transmitting, from a vehicle, a first chirp signal by a first sensor, in a first time-channel and in a first frequency-channel. The method may also include generating and transmitting, a second chirp signal by a second sensor, in a second time-channel and in the first frequency-channel. The method may continue by time synchronizing the first sensor and the second sensor and also receiving, by the first sensor, a first reflection signal from one or more objects from the first chirp signal. The method may also include determining, by a processing logic, a noise level of the first reflection signal, wherein the noise level is stored in a memory including a time decay mechanism. The method may also include generating, when the noise level is greater than a threshold, by the first sensor, a subsequent chirp signal in a second time-frequency-channel, and wherein the second frequency-channel is orthogonal to a first time-frequency-channel. The method may continue by categorizing, when the noise level is greater than a threshold level, a current time-frequency channel as occupied and by also receiving, by the second sensor, a second reflection signal from one or more objects from the second chirp signal. The method may also include performing, by the processing logic, a range fast Fourier transform (FFT), a Doppler FFT, and a digital beamforming on the reflection signals, where wherein the first time-channel is orthogonal to the second time-channel, and where the transmitting of the second chirp signal is offset in time from the transmitting of the first chirp signal by an amount less than a duration of the first chirp signal.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, serve to explain the principles of the disclosure.

Figure 1B:
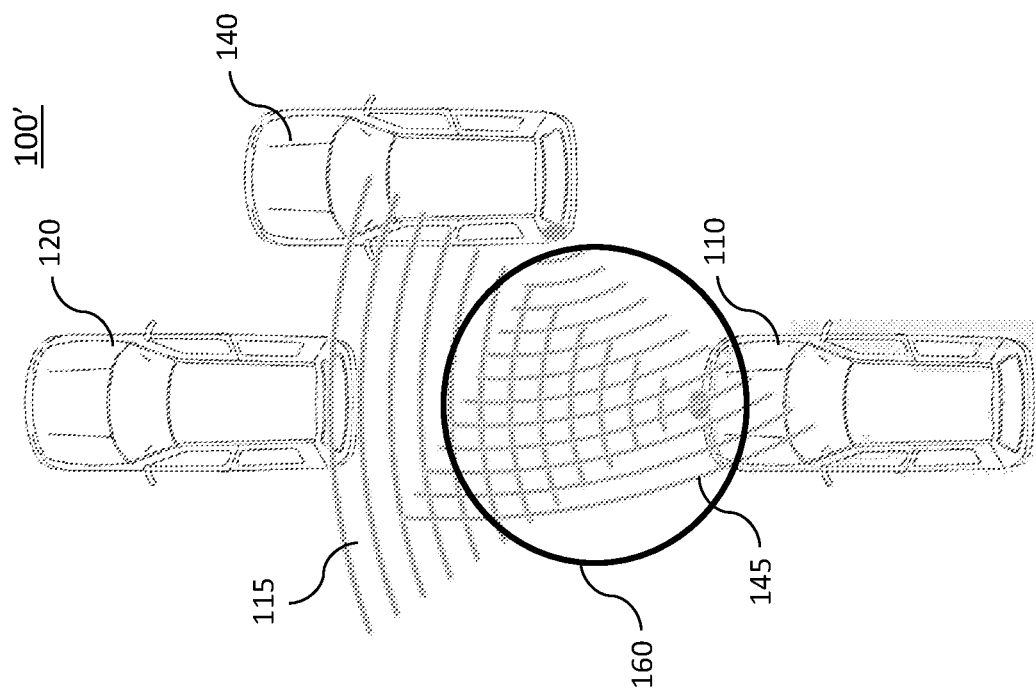
FIGS. 1A and 1B are illustrations of multi-vehicle situations with interfering sensor signals, in accordance with the disclosure.

The appended drawings are not necessarily to scale and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

Figure 3:
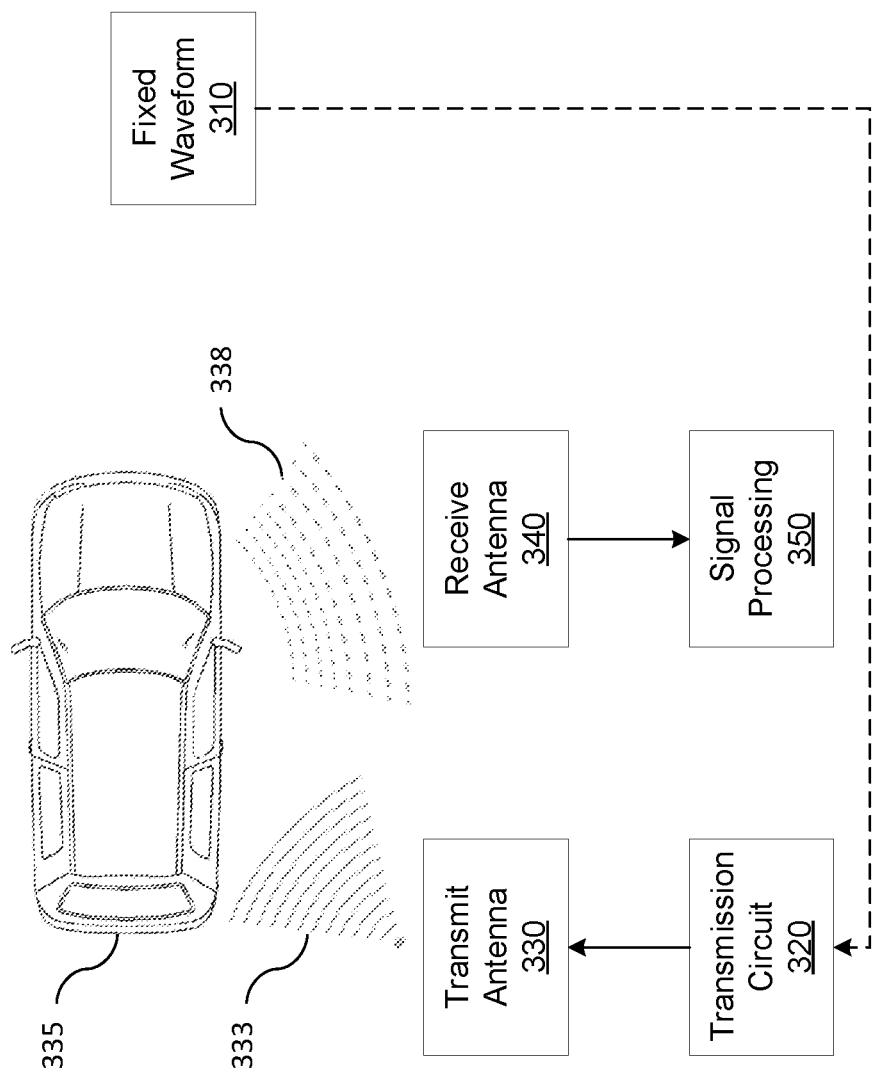
FIG. 3 is a process flow illustration of a sensor system, in accordance with the disclosure.

Referring to the drawings, the left most digit of a reference number identifies the drawing in which the reference number first appears (e.g., a reference number '310' indicates that the element so numbered is first labeled or first appears in FIG. 3). Additionally, elements which have the same reference number, followed by a different letter of the alphabet or other distinctive marking (e.g., an apostrophe), indicate elements which may be the same in structure, operation, or form but may be identified as being in different locations in space or recurring at different points in time (e.g., reference numbers "110a" and "110b" may indicate two different input devices which may be functionally the same, but may be located at different points in a simulation arena).

Autonomous vehicle and advanced driver assistance systems (AV/ADAS) such as adaptive cruise control, automated parking, automatic brake hold, automatic braking, evasive steering assist, lane keeping assist, adaptive headlights, backup assist, blind spot detection, cross traffic alert, local hazard alert, and rear automatic braking may depend on information obtained from cameras and sensors on a vehicle. As these types of features become more prevalent in vehicles the sensors that are relied on to enable such features are susceptible to radiation interference from other vehicles. This interference may lead to false alarms or the masking of true targets which in turn may degrade a system's performance that depends on sensor information. The severity of interference in a sensor may also be a function of the number of sensors in a given area. Thus, as AV/ADAS system become more prevalent, sensors within each vehicle become mission critical components requiring high reliability.

Figure 1A:
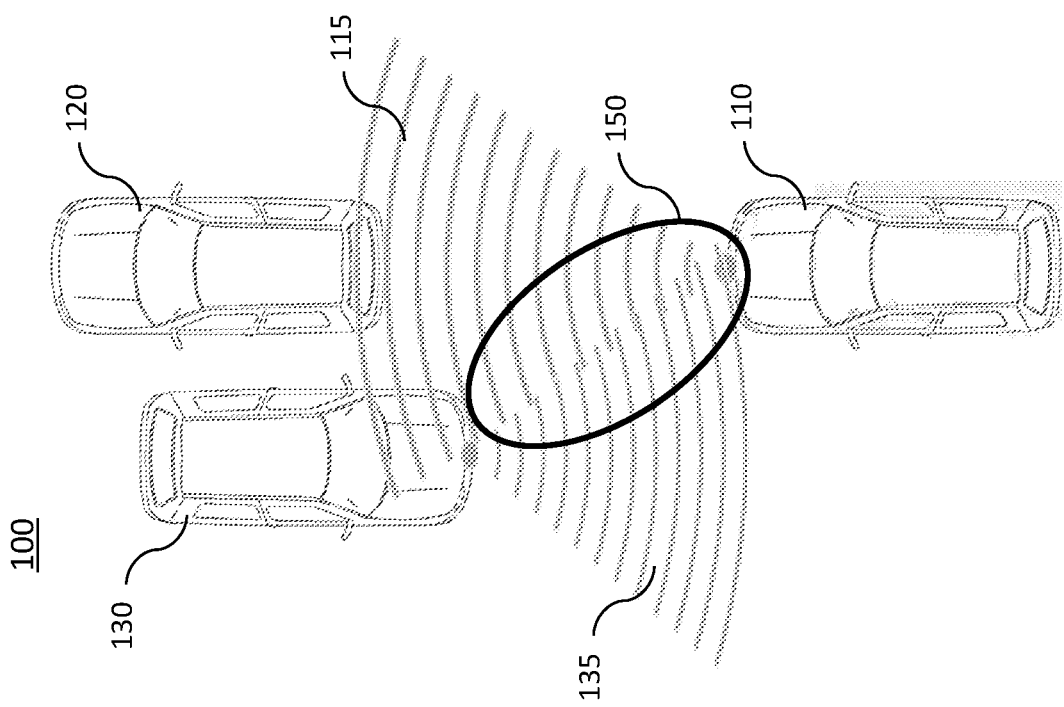

FIGS. 1A and 1B are illustrations of multi-vehicle situations 100 and 100' with possible interfering sensor signals, according to an embodiment of the present disclosure. In FIG. 1A, victim vehicle 110 is emitting, or transmitting, radiation signal 115, e.g., radar, lidar, or ultrasonic, towards a target vehicle 120. However, oncoming vehicle 130, that may also be equipped with a transmitting sensor and thus may also emit a radiation signal 135. Accordingly, there may be an interference region 150 in which victim vehicle 110 may receive radiation signal 135 instead of an expected reflected signal from its radiation signal 115 that may have been reflected off of the target vehicle 120. Such interference may result in false readings, possibly negating the desired reflected signal entirely. FIG. 1B illustrates a comparable situation where the victim vehicle 110 may receive a radiation signal 145 from an adjacent vehicle 140 thus generating an interference region 160. Sensors may operate at a variety of frequencies, or frequency ranges, and therefore especially if radiation signal 115 and radiation signal 135 or radiation signal 145 are operating at the same, or similar frequencies, the resulting interference may produce extremely undesirable results.

Figure 2:
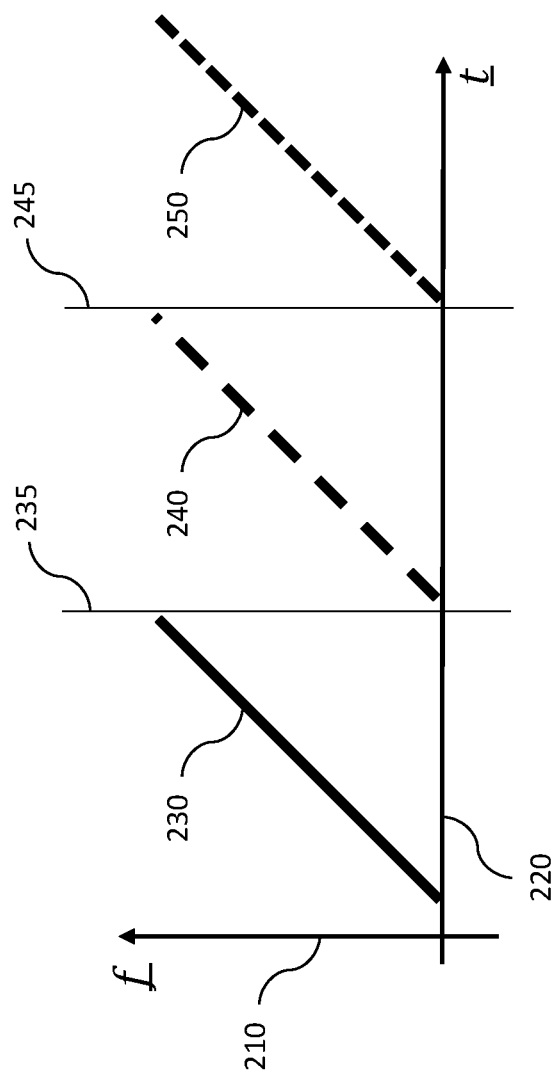
FIG. 2 is an illustration of multiple chirp signal waveforms, in accordance with the disclosure.

Sensor signals, for example radiation signal 115, may be produced as a number of chirp signals. Chirp signals may be defined as a signal in which the frequency increases, e.g., an up-chirp, or decreases (down-chirp) with time. In some embodiments, the term chirp may be used interchangeable with a sweep signal and may be applied to sonar, radar, and laser systems, and also may be used in spread-spectrum communications. FIG. 2 is an illustration of multiple chirp signal waveforms in a waveform 200, according to an embodiment of the present disclosure. Waveform 200 is illustrated on a frequency versus time chart with frequency axis 210 and time axis 220. Waveform 200 further illustrates three up-chirp signals 230, 240, and 250 separated in time. Note, to obtain orthogonality between up-chirp signals 230, 240, and 250, each up-chirp signal does not start until the previous up-chirp signal is completed. Thus, up-chirp signal 240 does not start until up-chirp signal 230 is completed as shown by time mark 235. In the same fashion up-chirp signal 250 does not start until up-chirp signal 240 is completed as shown by time mark 245. While such an approach maintains orthogonality, it also limits the frequency of possible chirp signals. Instead of a chirp signal in waveform 200, a different type of waveform may be used, such as a fixed waveform as discussed in FIG. 3.

FIG. 3 is an illustration of a possible process flow 300 of a sensor system, according to an embodiment of the present disclosure. Process flow 300 includes the generation of a fixed waveform 310. Fixed waveform 310 may include waveforms such as a square wave, a rectangular wave, a triangular wave, or a sawtoothed wave as examples. Once fixed waveform 310 is generated the waveform may be passed to a transmission circuit 320 which may then transmit, or broadcast a waveform signal 333 through a transmit antenna 330. Waveform signal 333 may then be reflected off an object, for example target vehicle 335, and be returned as reflected signal 338 and received by a receive antenna 340. The received reflected signal 338 may then be processed by a signal processing 350 component that may determine various pertinent information, for example, a distance from between the receive antenna 340 and the target vehicle 335, speed of the target vehicle 335, shape of the target vehicle, etc.

Figure 4:
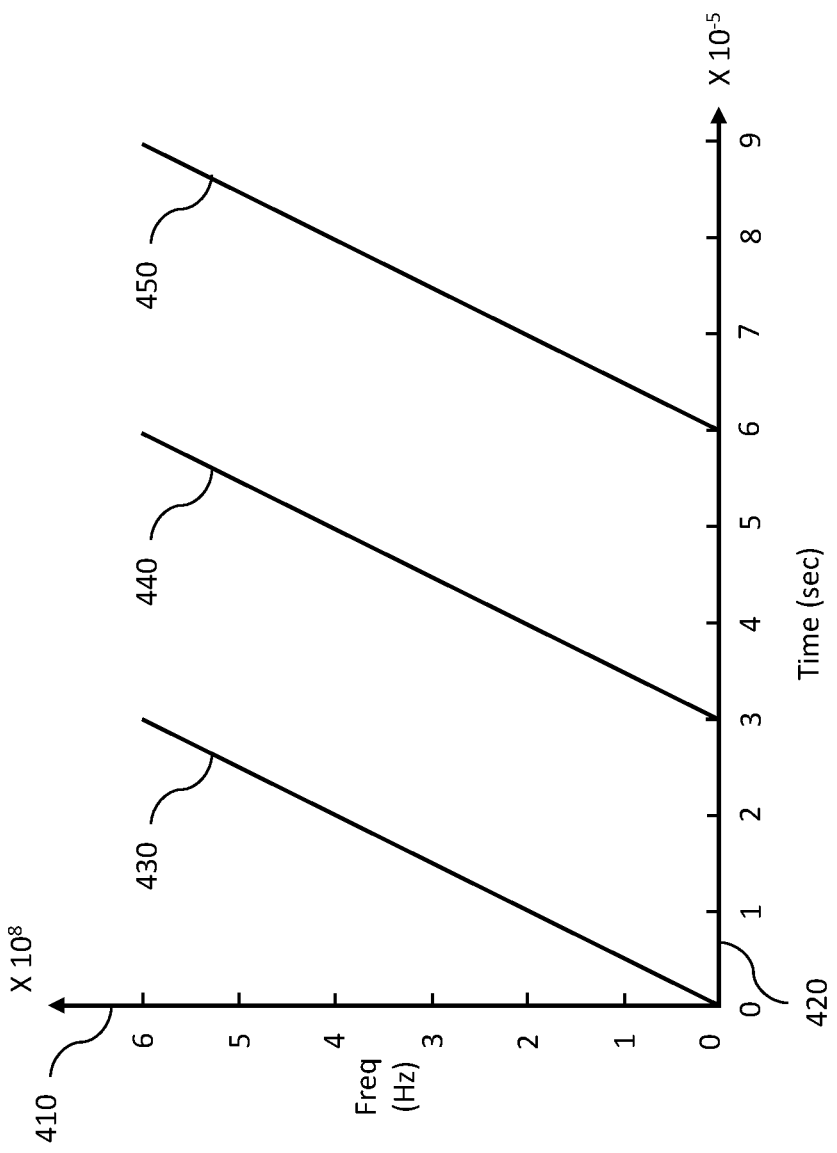
FIG. 4 is an illustration of multiple chirp signal waveforms, in accordance with the disclosure.

FIG. 4 is an illustration of a multiple chirp signal waveform 400, according to an embodiment of the present disclosure. Waveform 400, shown as graphed on a vertical frequency axis 410 and a horizontal time axis 420, illustrates chirp signals 430, 440, and 450 where each chirp ranges up to approximately 600 Megahertz and where each chirp has a duration, or bandwidth, of approximately 30 microseconds.

Figure 5:
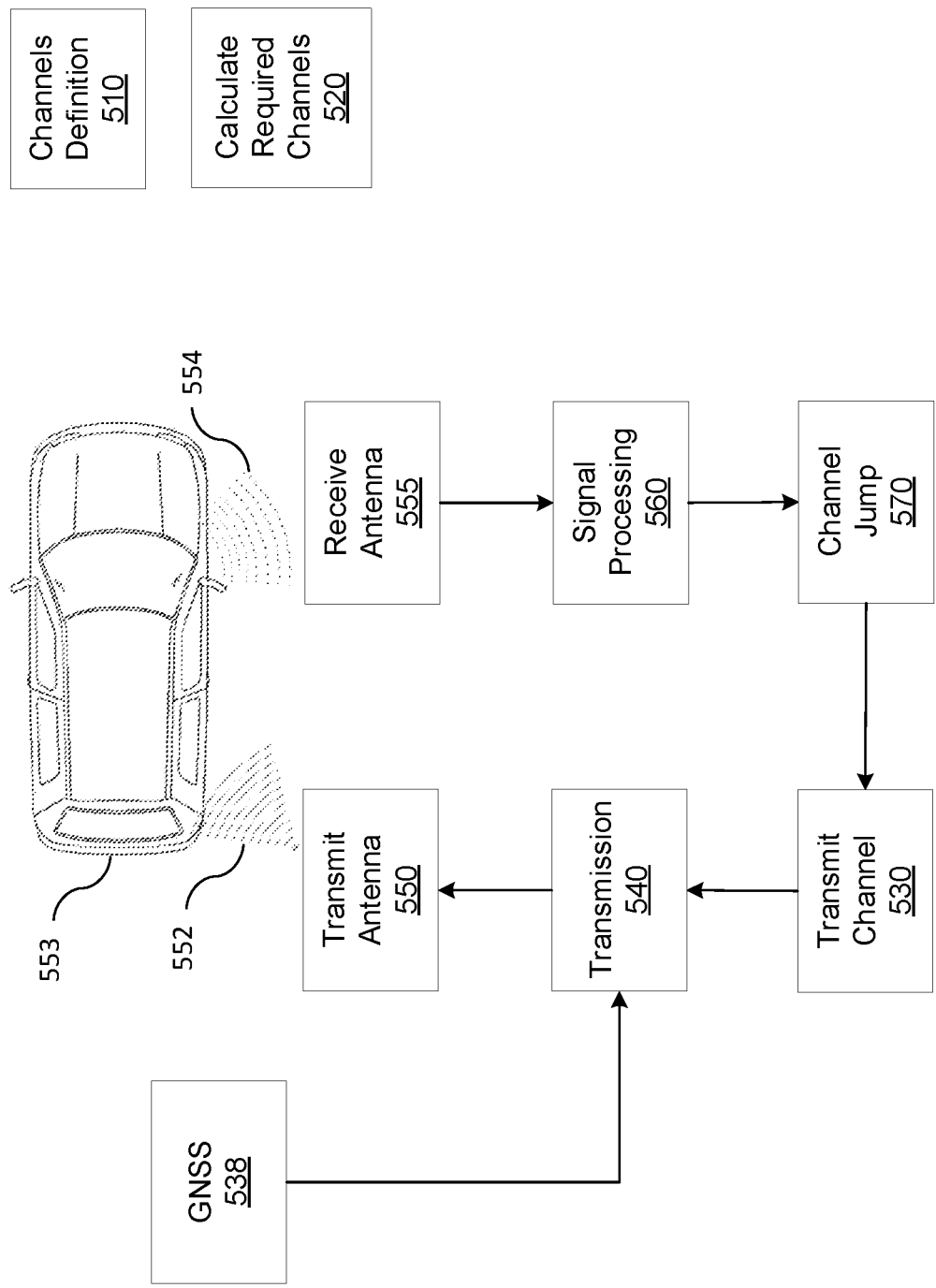
FIG. 5 is an illustration a time-frequency sensor system configuration, in accordance with the disclosure.

FIG. 5 is an illustration of a time-frequency sensor system 500, according to an embodiment of the present disclosure. System 500, while illustrating some similar components to process flow 300, may include a channels definition 510 component, a calculate required channels 520 component, a channel jump 570 component, and a time source GNSS 538 (global navigation satellite system) component. In addition, system 500 may include, for signal transmission, a transmit channel 530, a transmission 540 component, a transmit antenna 550 to transmit, or broadcast a waveform signal 552. The waveform signal 552 may then be reflected off an object, for example target vehicle 553, and returned as reflected signal 554. On the receiving side, system 500 may also include a receive antenna 555 and a signal processing 560 component.

Sensor system 500 may be directed to defining and tailoring frequency channels according to the signal's frequency modulation thereby enabling overlapping transmission of multiple signals and increasing the number of time channels while remaining orthogonal. In addition, system 500 may mitigate channel collision by interference estimation and channel jumping. Further, in some embodiments, each sensor is allocated to a frequency channel, thus avoiding interference from other channels. A more detailed explanation of each component follows.

Figure 6:
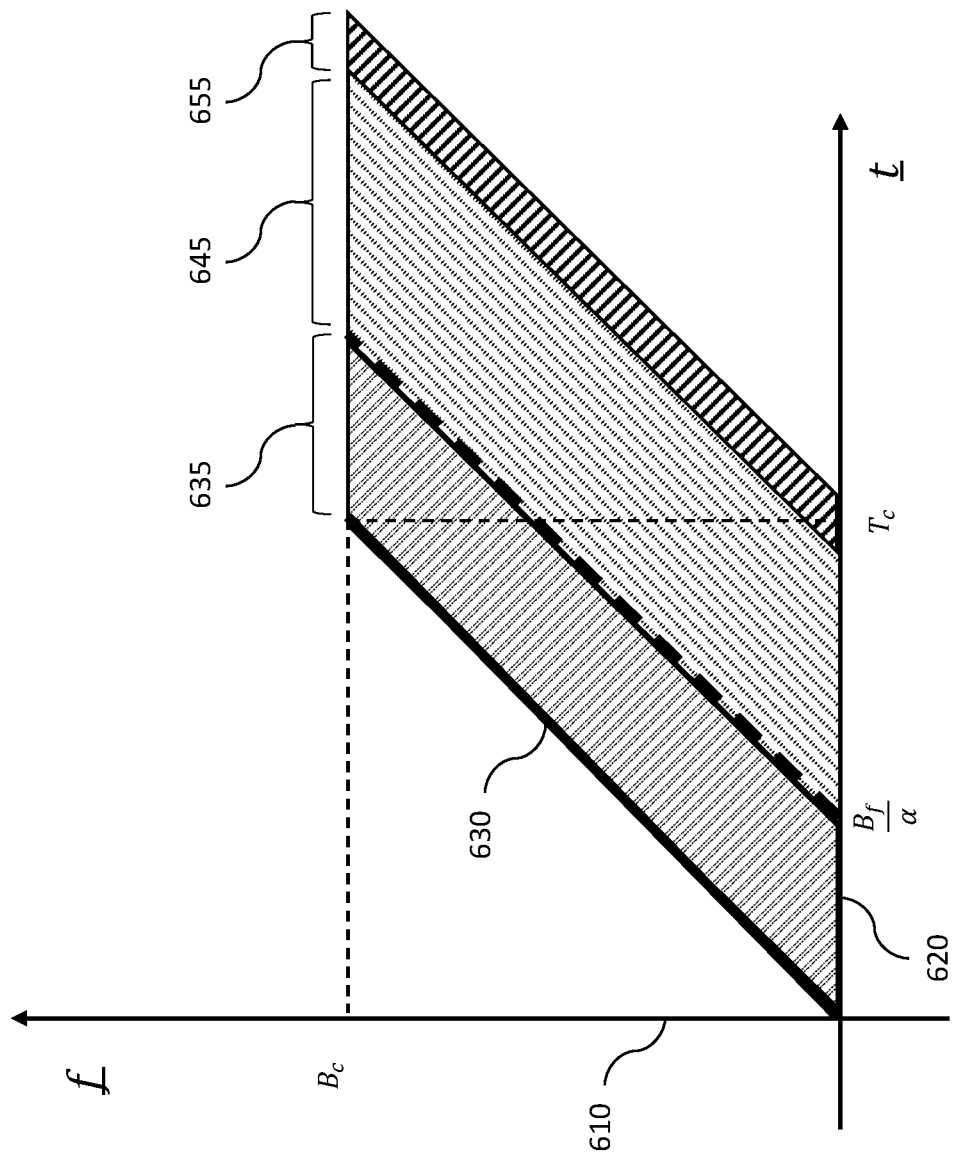
FIG. 6 is an illustration of a time-frequency sensor channel, in accordance with the disclosure.

The channel definition 510 component may be directed to an efficient definition of channels based on the particular characteristics of the waveform being used thus enabling a time efficient channel allocation. The channel definition 510 component is illustrated in FIG. 6, showing a time-frequency channel 600, according to an embodiment of the present disclosure. Channel 600, shown as graphed on a vertical frequency axis 610 and a horizontal time axis 620. Channel 600 may also include a waveform, here illustrated as a chirp signal 630 with a chirp duration of $T_c$, with a bandwidth $B_c$ and a chirp slope of $\alpha = B_c T_c$. Channel 600 also illustrates three other time components of a possible channel, for example, a signal reception time or a signal reception window, calculated as $B_f/\alpha$ and labeled as reception time 635, a propagation time 645, and a synchronization margin 655.

A channel may be defined, assuming a linear Frequency Modulated (LFM) signal with a chirp duration of $T_c$, a bandwidth $B_c$, and a chirp slope of $\alpha = B_c T_c$, with a pulse repetition interval (PRI) of $T_R$. As discussed in FIG. 2 and FIG. 4, each signal may be transmitted in its own timeslot that may be defined by the duration of the signal, in other words with no overlap in time with another signal. System 500 may utilize a different time channel coding that considers a low-pass filter inserted into a sensor's hardware reception time of $B_f/\alpha$, the reception frequency window may vary during the chirp duration by mixing the received signal with a reference signal, a process that may be referred to as stretch-processing. In addition to a maximal propagation delay between two of the most distant relevant signal sources, e.g., radars, categorized as $\tau_{max}$ and a time synchronization accuracy categorized as $\delta$. Further, the low-pass filter may be defined by $B_f$, which filters frequency offset higher than $B_f$ and may be defined as the sampling frequency.

Thus, the following equation defines the start of the $n^{th}$ time channel:

$$t_n = \left(\frac{B_f}{\alpha} + \tau_{max} + \delta\right) \cdot (n-1), \alpha = \frac{B_c}{T_c}$$

Further, the maximum propagation delay may then be defined according to the required attenuation between signal sources as follows:

$$\tau_{max} = \max(\frac{1}{c}\sqrt{\frac{1}{(4\pi)^2 10^{\frac{A}{10}}}} - \frac{B_f}{\alpha} - \delta, 0)$$

Where A[dB] may be the required attenuation.

Figure 7:
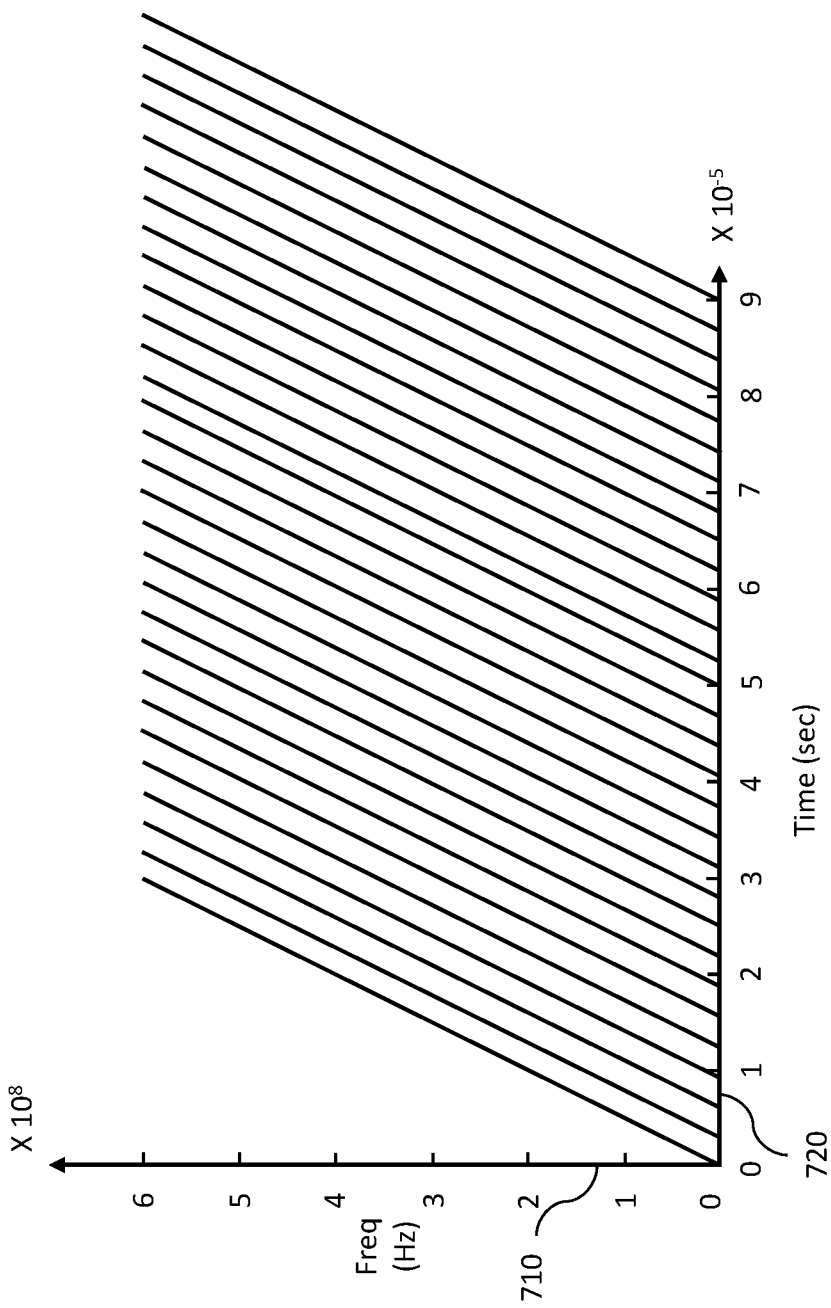
FIG. 7 is an illustration of an overlapping time-frequency sensor waveform, in accordance with the disclosure.

In addition, the entire automotive radar spectrum may be exploited to allow for additional transmitting channels shown as:

$$f_k = f_0 + \alpha T_c k$$

Where $f_0$ is the start of the allocated spectrum and it is constrained by the allocated spectrum span. Thus, a total number of channels may be defined as the number of time channels multiplied by the number of frequency channels, which may be illustrated in FIG. 7. FIG. 7 is an example time-frequency sensor system, according to an embodiment of the present disclosure. In this example $B_c$=600 Mhz, $T_c$=30 µsec, $T_r$=90 µsec, $B_f$, $f_s$=10 MHz, $\tau_{max}$=2.4 µsec, and $\delta$: 0.1 usec=100 PPM in 1 sec. Thus, in a scenario where the maximal propagation range between signal sources (radars) is 870 meters, e.g., 80 dB attenuation), for a short-range radar, and if the total time band is 90 µsec, a single PRI, then using the configuration shown in FIG. 4 produces three channels, e.g., chirp signals 430, 440 and 450 versus the 30 channels as shown in FIG. 7. FIG. 7 illustrates the 30 channels of overlapping signals where the transmitting of a subsequent chirp signal is offset in time from the transmitting of the preceding chirp signal by an amount less than a duration of the preceding chirp signal. The graph illustrates the frequency of the signal on the vertical frequency axis 710 versus time on the horizontal time axis 720.

Figure 8:
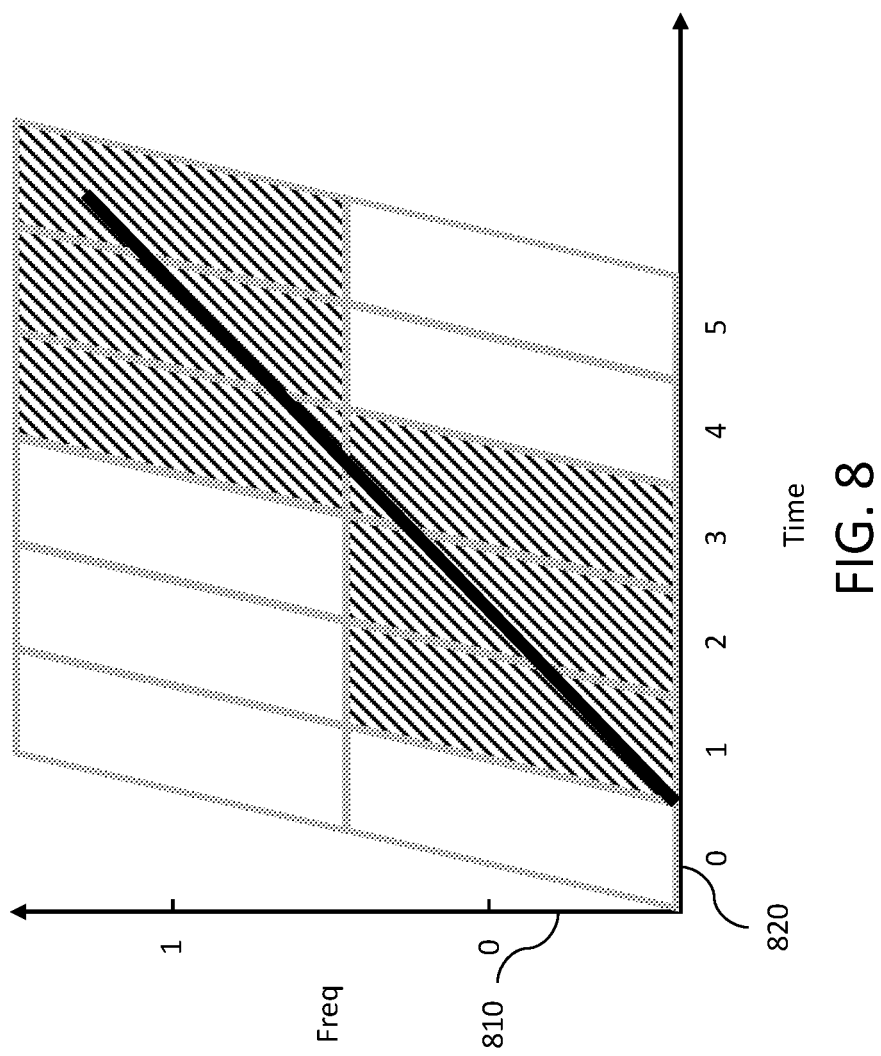
FIG. 8 is an illustration of a multiple time-frequency channel waveform, in accordance with the disclosure.

Next, the calculate required channels 520 component is addressed where different type of waveforms may require multiple time and frequency channels as illustrated in FIG. 8, according to an embodiment of the present disclosure. FIG. 8 illustrates a waveform 800 that spans across five time channels and two frequency channels, according to an embodiment of the present disclosure. The graph illustrates the frequency of the signal on the vertical frequency axis 810 versus time on the horizontal time axis 820. The required channel calculation may be defined for a certain waveform consisting of parameters that may include a slope $\alpha$, a chirp duration $T_c$, a channel time length $T_{channel}$ and a channel bandwidth $BW_{channel}$.

As an example, for a LFM radar with a different waveform of slope $\alpha_r$ and chirp duration $T_{(Cr)}$ the required frequency and time channels may be defined as follows:

$$\text{If } \alpha_r < \alpha: j = \left[\left\lfloor i\frac{\frac{BW_{channel}}{\alpha_r} - T_c}{T_{channel}}\right\rfloor, \ldots, \left\lceil (i+1)\frac{\frac{BW_{channel}}{\alpha_r} - T_c}{T_{channel}}\right\rceil\right],$$

$$0 \le i < \left\lfloor\frac{\alpha_r T_{c_r}}{BW_{channel}}\right\rfloor$$

$$j = \left[\left\lfloor i\frac{\frac{BW_{channel}}{\alpha_r} - T_c}{T_{channel}}\right\rfloor, \ldots, \left\lceil\frac{T_{c_r} - T_c}{T_{channel}}\right\rceil\right], i = \left\lfloor\frac{\alpha_r T_{c_r}}{BW_{channel}}\right\rfloor$$

$$\text{If } \alpha_r > \alpha: j = \left[\left\lfloor (i+1)\frac{\frac{BW_{channel}}{\alpha_r} - T_c}{T_{channel}}\right\rfloor, \ldots, \left\lceil i\frac{\frac{BW_{channel}}{\alpha_r} - T_c}{T_{channel}}\right\rceil\right],$$

$$0 \le i < \left\lfloor\frac{\alpha_r T_{c_r}}{BW_{channel}}\right\rfloor$$

$$j = \left[\left\lfloor\frac{T_{c_r} - T_c}{T_{channel}}\right\rfloor, \ldots, \left\lceil i\frac{\frac{BW_{channel}}{\alpha_r} - T_c}{T_{channel}}\right\rceil\right], i = \left\lfloor\frac{\alpha_r T_{c_r}}{BW_{channel}}\right\rfloor$$

i indicates the frequency channels, j indicates the time channels, initial channel is i=0, j=0 The number of channels used is:

$$N_{channels} = \left\lceil\frac{T_c + \tau_{max} + \delta}{T_{channel}}\right\rceil + \left\lceil\frac{\alpha_r T_{c_r}}{BW_{channel}}\right\rceil - 1$$

Next, the transmit channel 530 component may store the transmitted channels information. In an embodiment, the initial transmit channel may be chosen randomly. However, the transmit channel may also change due to feedback information from the channel jump 570 component, which will be discussed. Transmission 540 component may generate a transmit signal according to the corresponding frequency and time of the transmit channel. The frequency and time of the transmit channel may define the initial time and initial frequency of the signal. In addition, transmit channel 530 may receive a time synchronization signal from any global navigation satellite system, e.g., GNSS 538, which is a term meant to describe a satellite constellation that provides positioning, navigation, and timing services on a global or regional basis, e.g., Global Positioning System.

From the transmission 540 component a waveform signal may then be transmitted, or broadcast, as a waveform signal 552 through a transmit antenna 550. Waveform signal 552 may then be reflected off an object, for example target vehicle 553, and be returned as reflected signal and received by a receive antenna 555. The received reflected signal 554 may then be processed by a signal processing 560. Signal processing 560, which may also be referred to as radar processing, may perform processing based on a range fast Fourier transform (FFT), a Doppler FFT, and digital beamforming. Further, signal processing 560 may estimate a noise level of the channel based on the following:

$$\text{Noise} = \frac{1}{HLK}\sum_{h=0}^{H-1}\sum_{l=0}^{L-1}\sum_{k=0}^{K-1} RDC[k, l, h]$$

Where RDC[k, l, h] may be the signal data cube after Range FFT and Doppler FFT, but before digital beamforming. With range dimension k, Doppler dimension l and channel dimension h. K, L, H may represent the number of samples in the range, Doppler, and channel dimensions, respectively.

Figure 9:
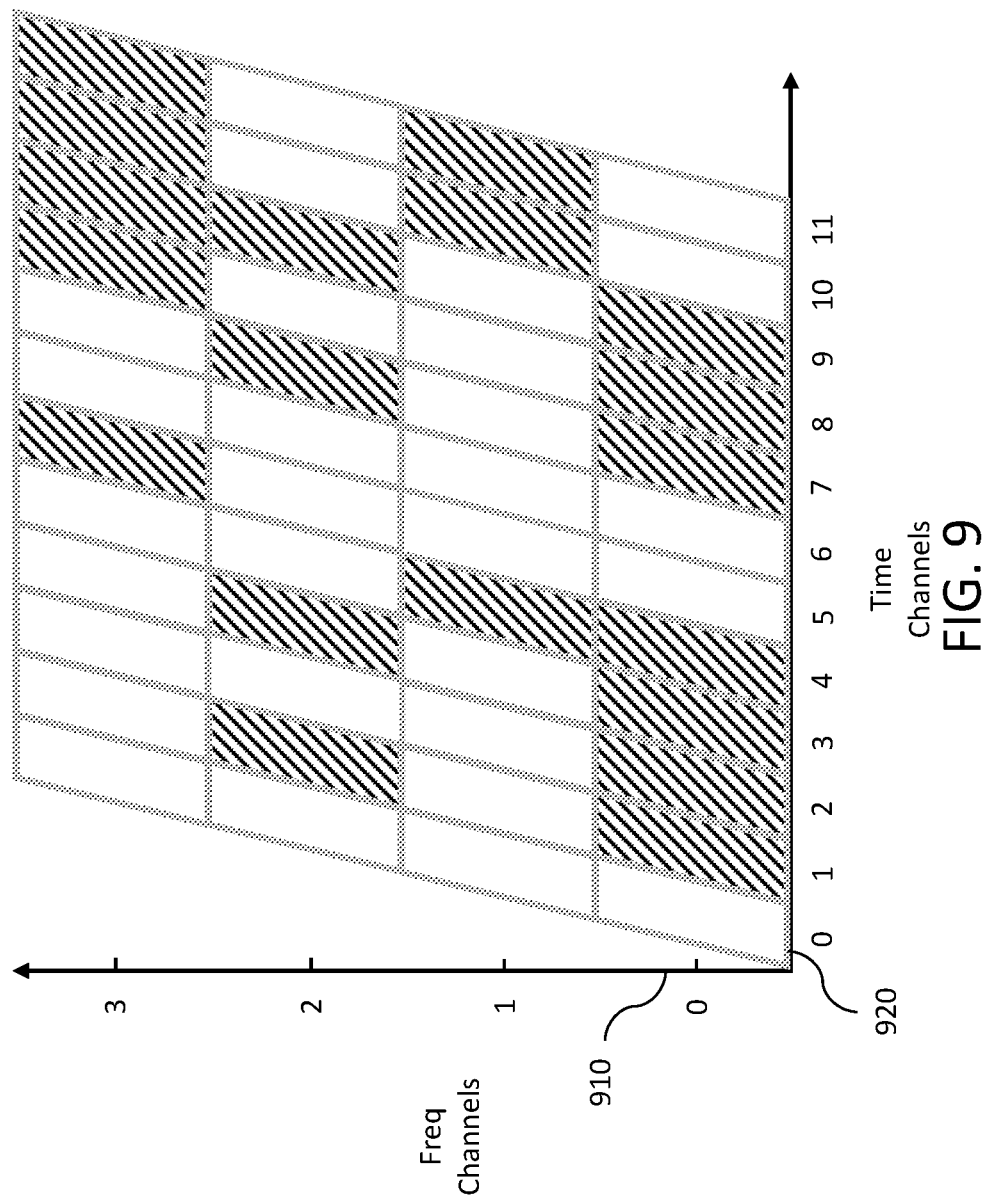
FIG. 9 is an illustration of a multiple time-frequency plot with noise, in accordance with the disclosure.

After signal processing 560, the channel jump 570 component may utilize the noise data estimated by signal processing 560. An example of channel management is illustrated in FIG. 9, according to an embodiment of the present disclosure. FIG. 9 illustrates the frequency channels on the vertical frequency axis 910 versus time channels on the horizontal time axis 920. For example, FIG. 9 illustrates that time channel 0 may have minimal noise, compared to a threshold, on the illustrated frequency channels. In contrast time channel 1 may indicate noise above a threshold level on frequency channel 0 and 2.

Channel jump 570 component may, based on its received noise data, determine that a particular transmit frequency channel may have an estimated noise level above a predetermined threshold and thus that particular frequency channel may be categorized as occupied. Further, the associated noise level may be stored in memory. The current channels may be defined as discussed regarding the channels definition 510 component. The channel shape, or definition, in FIG. 9 is merely illustrative. The channel jump 570 component may then mark multiple channels according to noise level accordingly.

Figure 10:
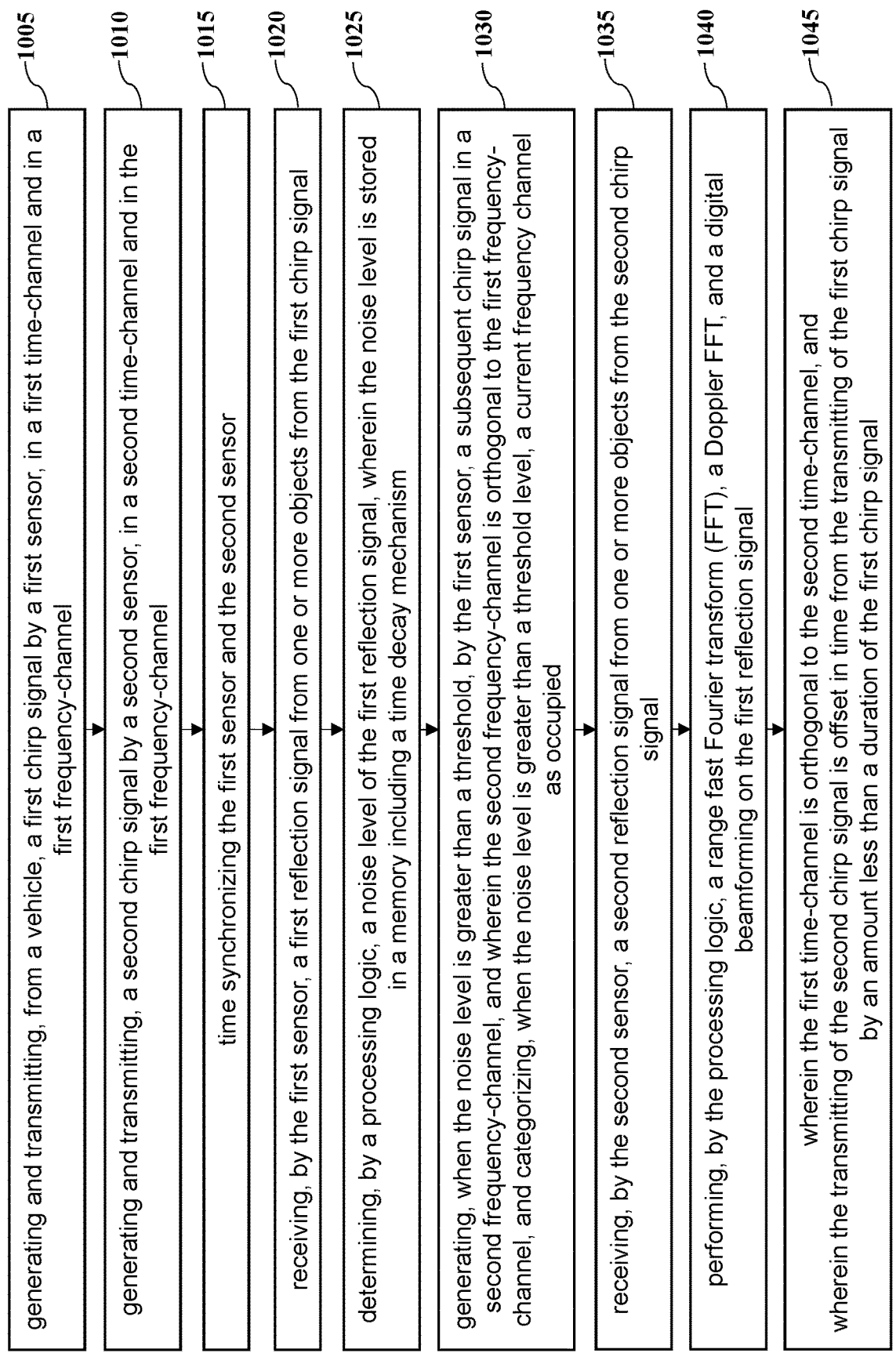
FIG. 10 depicts a flowchart of a method for time-frequency coding for interference mitigation of sensors, in accordance with the disclosure.

A new frequency channel, for example, in the next time channel, may be randomly selected from the available frequency channels, e.g., not the occupied marked frequency channels. However, in an embodiment, if the frequency channels are occupied, channel jump 570 component may select the frequency channel with the lowest noise level as discussed in the calculate required channels 520 component. Further, over time the noise level in any particular frequency channel may change. Thus, a noise level decay factor, e.g., β, may be applied to the FIG. 9 map 900 and may be performed for each new frame in a stream of waveform transmissions. Thus, Map=β·Map. For waveforms consisting of multiple time-frequency channels, multiple channels may be selected in such a manner that all of the selected channels are unoccupied. If such channels span is not available, the channel span with lowest average noise may be selected FIG. 10 shows an exemplary embodiment of a method for time-frequency code for interference mitigation of sensors. Method 1000 begins at step 1005 with generating and transmitting, from a vehicle, a first chirp signal by a first sensor, in a first time-channel and in a first frequency-channel. As discussed in FIG. 5, system 500 may be directed to defining and tailoring frequency channel according to the signal's frequency modulation where the channel definition is based on the characteristics of the waveform, such as the first chirp signal. Further, as discussed in FIG. 8, the system may perform a calculation of the required channels. For example, a square wave waveform may require more channels than a chirp signal with a small chirp duration. The calculate required channels 520 component may compute the required time and frequency channels based on a slope of the signal waveform, a duration of the signal, a channel time length, and a channel bandwidth. Step 1010 includes generating and transmitting, a second chirp signal by a second sensor, in a second time-channel and in the first frequency-channel. In an embodiment, a different sensor is associated with each frequency channel thereby mitigating interference. However, a sensor may include multiple components to accomplish the same effect, namely producing multiple signal waveforms in different frequency channels where the signals are orthogonal and may not interfere with each other. As will be discussed in step 1045, the second chirp signal is offset in time from the transmitting of the first chirp signal by an amount less than a duration of the first chirp signal thereby allowing for an overlapping of signals thus creating the ability to generate additional time channels as discussed in FIG. 7.

At step 1015 a time synchronization may be performed between the sensors thereby allowing all sensors to operate synchronously. However, in step 1015 the time synchronization is applied to the first sensor and the second sensor, but that any number of sensors are applicable and not limited to any particular number of sensors.

At step 1020 there may be a receiving, by the first sensor, of a first reflection signal from one or more objects from the first chirp signal. As illustrated in FIG. 3 and FIG. 5, a generated signal may be transmitted, e.g., by transmission 540 component to the transmit antenna 550 component as waveform signal 552 that may be reflected by one or more objects, such as target vehicle 553, generating a first reflection signal, e.g., reflected signal 554.

At step 1025 there may be a determining, by a processing logic, a noise level of the first reflection signal, wherein the noise level is stored in a memory including a time decay mechanism. As discussed in FIG. 5, the signal processing 560 component may process the received reflected signal 554 to estimate a noise level of the channel. Further, the noise level information may be stored and used by the channel jump 570 component to determine the best frequency channel. Also, over time the noise level in any particular frequency channel may change and to compensate, a noise level decay factor, e.g., β, may be applied, for example, to the FIG. 9 map and may be performed for each new frame in a stream of waveform transmissions. Thus, the decay mechanism may give a greater weight to recent noise level data while diminishing the weight of the noise level data over time.

At step 1030 there may be a generating, when the noise level is greater than a threshold, by the first sensor, a subsequent chirp signal in a second frequency-channel, and wherein the second frequency-channel is orthogonal to the first frequency-channel, and categorizing, when the noise level is greater than a threshold level, a current frequency channel as occupied. As shown in FIG. 9, noise level data may be associated with each frequency and time channel thereby allowing for the channel jump 570 component to determine the best frequency channel within a specific time-channel.

At step 1035 there may be a receiving, by the second sensor, a second reflection signal from one or more objects from the second chirp signal. As was shown in FIG. 3 and FIG. 5, sensors may generate a stream of waveforms that are transmitted by transmission 540 component through the transmit antenna 550 to a target object, such as target vehicle 553 producing a reflected signal 554. As shown in FIG. 7, multiple overlapping chirp signals may be produced thereby creating multiple received reflected signals.

At step 1040 the processing logic, such as signal processing 560, may perform a range fast Fourier transform (FFT), a Doppler FFT, and a digital beamforming on the first reflection signal.

At step 1045, it may be determined that the first time-channel is orthogonal to the second time-channel, and where the transmitting of the second chirp signal is offset in time from the transmitting of the first chirp signal by an amount less than a duration of the first chirp signal. For example, FIG. 7 illustrates the 30 channels of overlapping signals where the transmitting of a subsequent chirp signal is offset in time from the transmitting of the preceding chirp signal by an amount less than a duration of the preceding chirp signal.

Method 1000 may then end.

The description and abstract sections may set forth one or more embodiments of the present disclosure as contemplated by the inventor(s), and thus, are not intended to limit the present disclosure and the appended claims.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof may be appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments.

Exemplary embodiments of the present disclosure have been presented. The disclosure is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the disclosure.

What is claimed is:

1. A system of time-frequency coding for interference mitigation of sensors comprising:
    a first sensor, in a vehicle, configured to generate and transmit a first chirp signal, in a first time-channel and in a first frequency-channel, and to receive a first reflection signal from one or more objects from the first chirp signal;
    a second sensor configured to generate and transmit a second chirp signal in a second time-channel and in the first frequency-channel, and to receive a second reflection signal from one or more objects from the second chirp signal; and
    a processing logic to determine a noise level of the first reflection signal, and determine that the noise level is greater than a threshold,
    wherein in response to the determination that the noise level is greater than the threshold, the first sensor is configured to generate a subsequent chirp signal in a second time-frequency-channel,
    wherein the second time-frequency-channel is orthogonal to a first time-frequency-channel,
    wherein the first time-channel is orthogonal to the second time-channel, and
    wherein the transmitting of the second chirp signal is offset in time from the transmitting of the first chirp signal by an amount less than a duration of the first chirp signal.

2. The system of claim 1, further comprising a third sensor configured to generate a waveform allocated across a plurality of time-frequency-channels.

3. The system of claim 1, wherein the first sensor and the second sensor are time synchronized.

4. The system of claim 1, wherein the noise level is stored in a memory including a time decay mechanism.

5. The system of claim 1, wherein in response to the determination that the noise level is greater than the threshold, a current time-frequency channel is categorized as occupied.

6. The system of claim 5, wherein the first sensor and the second sensor are configured not to transmit on an occupied frequency channel.

7. The system of claim 1, further comprising a processing logic to perform a range fast Fourier transform (FFT), a Doppler FFT, and a digital beamforming on the first reflection signal.

8. The system of claim 1, wherein the second sensor is not located in the vehicle.

9. The system of claim 1, wherein the first sensor and the second sensor are configured to compensate for a distance from the one or more objects and a synchronization error.

10. A method for time-frequency coding for interference mitigation of sensors comprising:
    generating and transmitting, from a vehicle, a first chirp signal by a first sensor, in a first time-channel and in a first frequency-channel;
    generating and transmitting, a second chirp signal by a second sensor, in a second time-channel and in the first frequency-channel;
    receiving, by the first sensor, a first reflection signal from one or more objects from the first chirp signal;
    receiving, by the second sensor, a second reflection signal from one or more objects from the second chirp signal;
    determining, by a processing logic, a noise level of the first reflection signal;
    determining, by the processing logic, that the noise level is greater than a threshold; and
    generating, in response to the determining that the noise level is greater than the threshold, by the first sensor, a subsequent chirp signal in a second time-frequency-channel,
    wherein the second time-frequency-channel is orthogonal to a first time-frequency-channel,
    wherein the first time-channel is orthogonal to the second time-channel, and
    wherein the transmitting of the second chirp signal is offset in time from the transmitting of the first chirp signal by an amount less than a duration of the first chirp signal.

11. The method of claim 10, further comprising generating, by a third sensor, a waveform allocated across a plurality of time-frequency-channels.

12. The method of claim 10, further comprising time synchronizing the first sensor and the second sensor.

13. The method of claim 10, wherein the noise level is stored in a memory including a time decay mechanism.

14. The method of claim 10, further comprising, categorizing, in response to the determination that the noise level is greater than the threshold, a current time-frequency channel as occupied.

15. The method of claim 14, wherein the first sensor and the second sensor are configured not to transmit on an occupied frequency channel.

16. The method of claim 10, further comprising performing, by a processing logic, a range fast Fourier transform (FFT), a Doppler FFT, and a digital beamforming on the first reflection signal.

17. The method of claim 10, further comprising compensating, by the first sensor and the second sensor, for a distance from the one or more objects and a synchronization error.

18. A method for time-frequency coding for interference mitigation of sensors comprising:
generating and transmitting, from a vehicle, a first chirp signal by a first sensor, in a first time-channel and in a first frequency-channel;
generating and transmitting, a second chirp signal by a second sensor, in a second time-channel and in the first frequency-channel;
time synchronizing the first sensor and the second sensor;
receiving, by the first sensor, a first reflection signal from one or more objects from the first chirp signal;
determining, by a processing logic, a noise level of the first reflection signal;
determining, by the processing logic, that the noise level of the first reflection signal is greater than a threshold;
generating, in response to the determining that the noise level is greater than the threshold, by the first sensor, a subsequent chirp signal in a second time-frequency-channel, and wherein the second frequency-channel is orthogonal to a first time-frequency-channel;
categorizing, in response to the determining that the noise level is greater than the threshold, a current time-frequency channel as occupied;
receiving, by the second sensor, a second reflection signal from one or more objects from the second chirp signal; and
performing, by the processing logic, a range fast Fourier transform (FFT), a Doppler FFT, and a digital beamforming on the first reflection signal;
wherein the first time-channel is orthogonal to the second time-channel, and
wherein the transmitting of the second chirp signal is offset in time from the transmitting of the first chirp signal by an amount less than a duration of the first chirp signal.

19. The method of claim 18, wherein the noise level is stored in a memory including a time decay mechanism.

20. The method of claim 18, further comprising generating, by a third sensor, a waveform allocated across a plurality of time-frequency-channels.

* * * * *